US008360502B2

(12) United States Patent
Kartes et al.

(10) Patent No.: US 8,360,502 B2
(45) Date of Patent: Jan. 29, 2013

(54) TARP SYSTEM WITH A UNIVERSAL JOINT CONNECTOR

(75) Inventors: Scott Kartes, West Branch, MI (US); Timothy K Searfoss, West Branch, MI (US)

(73) Assignee: Roll-Rite, LLC, Alger, MI (US)

( * ) Notice: Subject to any disclaimer, the term of this patent is extended or adjusted under 35 U.S.C. 154(b) by 99 days.

(21) Appl. No.: 13/108,105

(22) Filed: May 16, 2011

(65) Prior Publication Data

US 2012/0001449 A1    Jan. 5, 2012

Related U.S. Application Data

(63) Continuation-in-part of application No. 12/827,541, filed on Jun. 30, 2010, now Pat. No. 7,967,364.

(51) Int. Cl.
*B60J 7/00* (2006.01)

(52) U.S. Cl. .................................... 296/100.14; 296/98

(58) Field of Classification Search ................ 296/98, 296/100.14
See application file for complete search history.

(56) References Cited

U.S. PATENT DOCUMENTS

| 5,002,328 A * | 3/1991 | Michel ............................ 296/98 |
| 7,188,887 B1 * | 3/2007 | Schmeichel ..................... 296/98 |
| 7,866,725 B1 * | 1/2011 | Searfoss et al. ................. 296/98 |

* cited by examiner

*Primary Examiner* — Joseph Pape
(74) *Attorney, Agent, or Firm* — Miller, Canfield, Paddock and Stone P.L.C.; Timothy J. Engling

(57) ABSTRACT

A tarp system with a knuckle arm assembly having a housing on an upper arm with a bent enclosure with a flexible torque shaft or universal joint connector substantially within the enclosure, such as an extruded tube. A first end of the flexible torque shaft or universal joint connector may be used in conjunction with a motor, preferably mounted away from the bend in the enclosure to minimize the envelope of the tarp system around a container of a container of a trailer or rail car. A second end of the flexible torque shaft or universal joint connector is attached to an axle shaft for a roller or the like that is used in conjunction with a tarp.

9 Claims, 10 Drawing Sheets

Fig. 8

Fig. 10

TARP SYSTEM WITH A UNIVERSAL JOINT CONNECTOR

CROSS REFERENCE TO RELATED APPLICATION

This application is a continuation-in-part application of U.S. patent application Ser. No. 12/827,541, filed Jun. 30, 2010, entitled "Tarp System with Flexible Torque Shaft."

FIELD OF THE DISCLOSURE

This disclosure relates to tarp systems for a container of trailers or railcars. More specifically, the disclosure relates to an arm assembly with a universal joint connector or flexible torque shaft substantially within a bent enclosure used with the tarp system.

BACKGROUND

Trucks and cabs pull trailers that often have tarp systems. Similarly, rail cars may have open top container cars for which tarp systems may be used. Tarps are well known for covering contents of a container of the trailers and railcars during transport. Roll tarps often include a tarp attached on an axle or roller to a side of a container. Tarp systems are well suited for local regulations that require a container to be covered while transporting contents of the container. But local regulations also often set side, front and corner restrictions on the envelope for the whole container with accessories.

For example, European and Australian regulations require a maximum envelope for containers of trailers. Similarly, rail cars have envelopes required to operate through tunnels and the like. This envelope includes additional accessories such as tarp systems. But containers of transfer trailers and railcars are often built for maximum volume since they typically haul light materials and will fill before they are over weight. Unfortunately, little space is left for incorporating a tarp system.

Automatic solutions for tarp operation are important as a safety and efficiency issue. One goal is to keep the trailer or railcar operators on the ground, rather than manually rolling and unrolling the tarp from a catwalk on the front of a container.

In typical powered tarp system, the motor is directly attached to the front of the axle. The motor is relatively big and bulky requiring a lot of space at the front corner to operate. The resulting geometry of such a motor may be outside the envelope defined by European or other regulations.

Multiple gearboxes, such as two 90 degree gearboxes were tried, but they still must square the corner with difficulties being in the required envelope. Also, the gears of required size cannot handle the necessary torque without reliability issues. Gear boxes used in association with corners of trailers often exceed the maximum allowable envelope for trailers.

Earlier Roll-Rite patents protect aspects of a motor and knuckle arm assembly to unroll to open and to roll to close the tarp to cover the contents of a container.

U.S. Pat. No. 6,916,060 discloses arm assembly for a cover of a truck having a base, an intermediate segment, and an extension.

U.S. Pat. No. 7,195,304 discloses roll tarp system for use on vehicles and trailers with rear doors or gates. The roll tarp system includes a tarp attached to a side of a container, a roller attached to the tarp opposite of the container, a rear inner arm pivotally attached to the container, a first bias member attached to the rear inner arm, a rear outer arm attached to the first bias member, a second bias member attached to the rear outer arm and rotatably connected to a rear end of the roller and a front support structure rotatably connected to a front end of the roller.

For jurisdictions with restrictions, suitable tarp systems must fit within envelope restrictions for an open top container.

SUMMARY

The present disclosure provides a tarp system with a universal joint connector or flexible torque shaft within a bent enclosure. This system is well suited for envelope restrictions for a container. The tarp system may include some conventional components, such as a motor and a knuckle arm assembly, to help operate the tarp system.

A tarp system with a movable tarp, such as a roll tarp, is adapted to cover contents of a container. The tarp system has a pivoting arm attached to a portion of the container, a pivot or knuckle between an upper arm and the pivoting arm, wherein the upper arm can pivot relative to the pivoting arm. A housing is mounted on the upper arm, and a motor is associated with the housing to minimize an envelope of the tarp system around the container. A bent enclosure, such as a rigid tube extrusion, extends from the housing, and a universal joint connector or a flexible torque shaft is substantially inside the bent enclosure. The universal joint connector or flexible torque shaft may include a flexible portion within the enclosure between a rigid first end and a rigid second end. The first end of the universal joint connector or flexible torque shaft is functionally connected with the motor, and the second end can be attached to an axle that is used in conjunction with the tarp. The first end preferably passes through the housing and is rotatable relative to the housing. A set of bearings can surround the ends of a universal joint connector or flexible torque shaft to facilitate rotation of the shaft relative to the enclosure.

The disclosed arm assembly and universal joint connector or flexible torque shaft in a bent enclosure allow components to operate within an envelope close to the container. With the disclosed upper arm assembly, the motor is located around the front corner of the container closer to the center of the whole assembly within the maximum envelope for containers and accessories as dictated by certain regulations. A relatively big and bulky component is located to accommodate space restrictions.

The universal joint connector or flexible torque shaft is easy and cost-effective to make, install and use with a low profile to a container.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
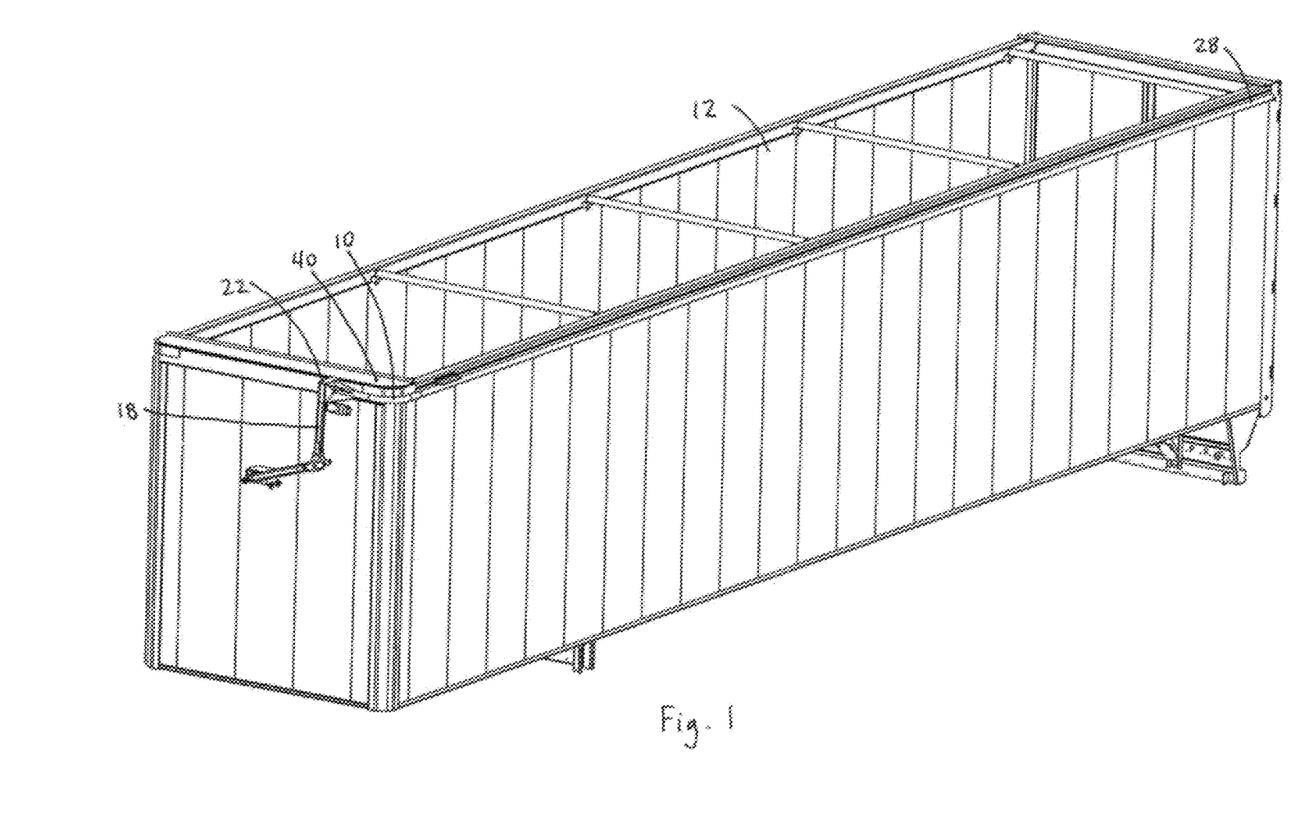
FIG. 1 shows a trailer with a universal joint connector or flexible torque shaft, pivot arm tarp system.
Figure 2:
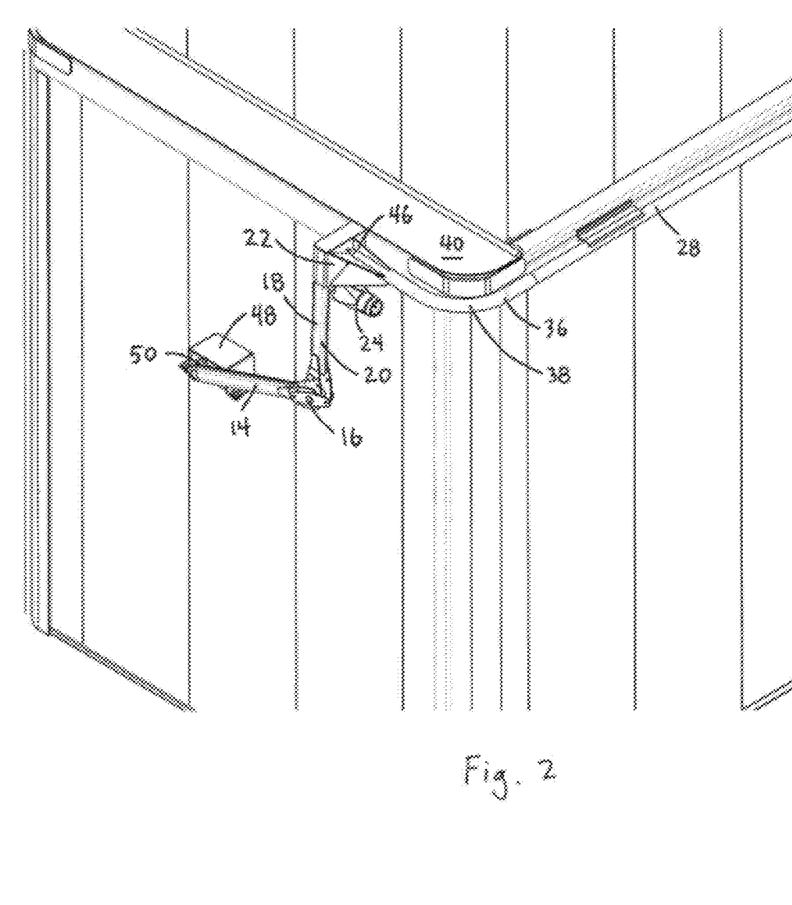
FIG. 2 shows an arm assembly including a universal joint connector or flexible torque shaft.
Figure 3:
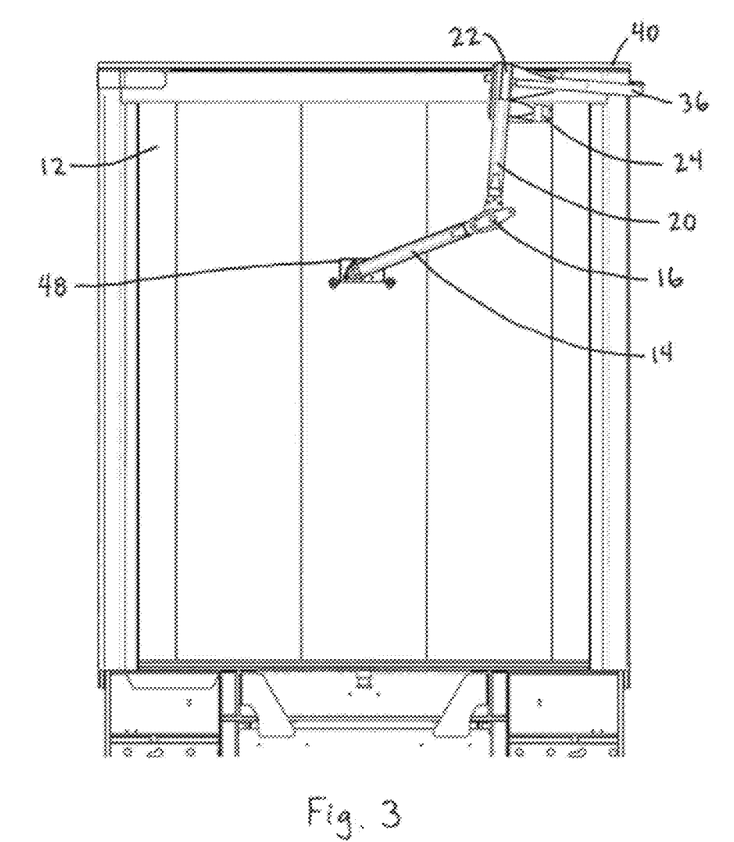
FIG. 3 shows a rear view of an arm assembly with an enclosure for the universal joint connector or flexible torque shaft used with the tarp system.

FIGS. 1 through 3 show a tarp system 10 attached to a container 12, an arm 14 pivotably attached to the container 12, a pivot 16 (may be called a knuckle) and an upper arm assembly 18. The upper arm assembly 18 includes an upper arm 20 (may be called a knuckle arm, which may pivot relative to the arm 14), a housing 22, and a motor 24 associated with the housing 22 adapted for use with a flexible torque shaft 26 or universal joint connector 27. The flexible torque shaft 26 or universal joint connector 27 curves around the container 12 to attach to an axle shaft 28 for a tarp 30. The low profile of the flexible torque shaft 26 or universal joint connector 27 in an enclosure 36 can be seen in FIG. 3.

A first end 32 of the flexible torque shaft 26 or universal joint connector 27 passes through the housing 22 and is rotatable relative to the housing 22. The first end 32 preferably operates in conjunction a motor 24 mounted in association with the housing 22. Bearings 34 preferably surround the shaft 22 at each end of the enclosure 36. As an example, the housing 22 can be shaped like an outbox with one wall part of the upper arm 20.

The motor 24 is described as associated with the housing 22 since the motor 24 may be mounted on the upper arm 20 or to the housing 22 or otherwise near an inner end of the enclosure 36. With the disclosed upper arm assembly 18, the motor 24 is located away from the corner 40 (i.e. front corner of a trailer) of the container 12 closer to the center of the upper arm assembly 18 to help stay within the maximum envelope for containers and accessories as dictated by certain regulations. A relatively big and bulky component like the motor 24 is located away from the corner 40 to accommodate space restrictions for streamlined operations regardless of such envelope restrictions. Functionally, the motor 24 is connected to the flexible torque shaft 26 or universal joint connector 27 to operate the axle shaft 28 for opening and closing a tarp 30.

Figure 4:
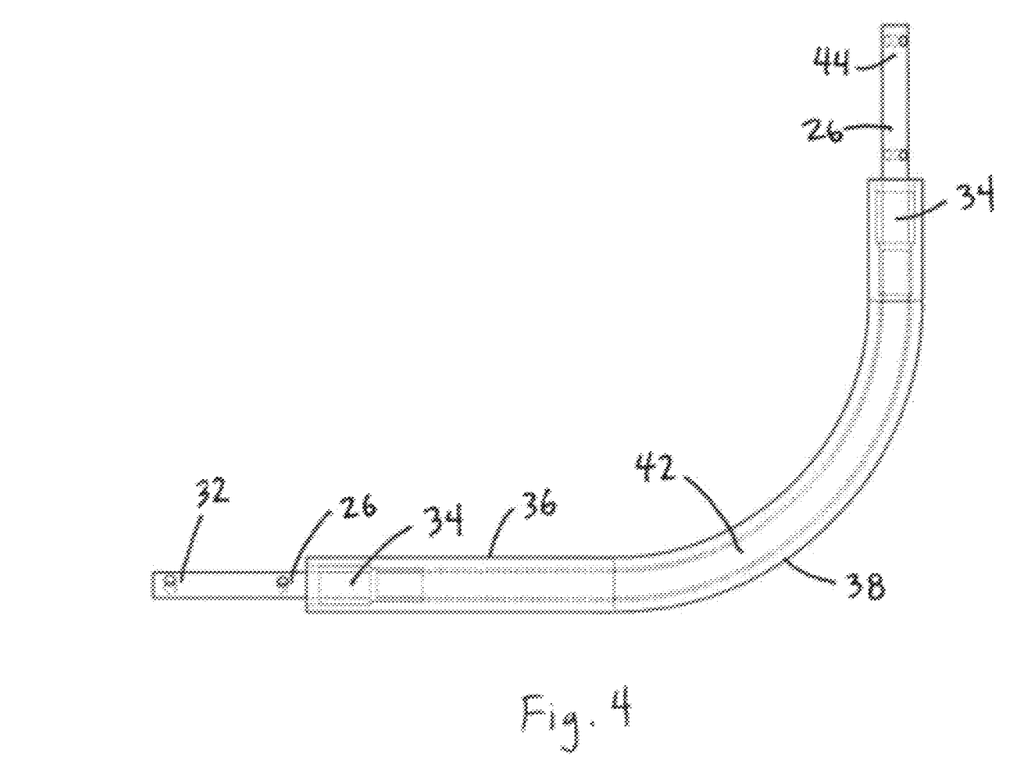
FIG. 4 shows a flexible shaft and enclosure assembly.
Figure 5:
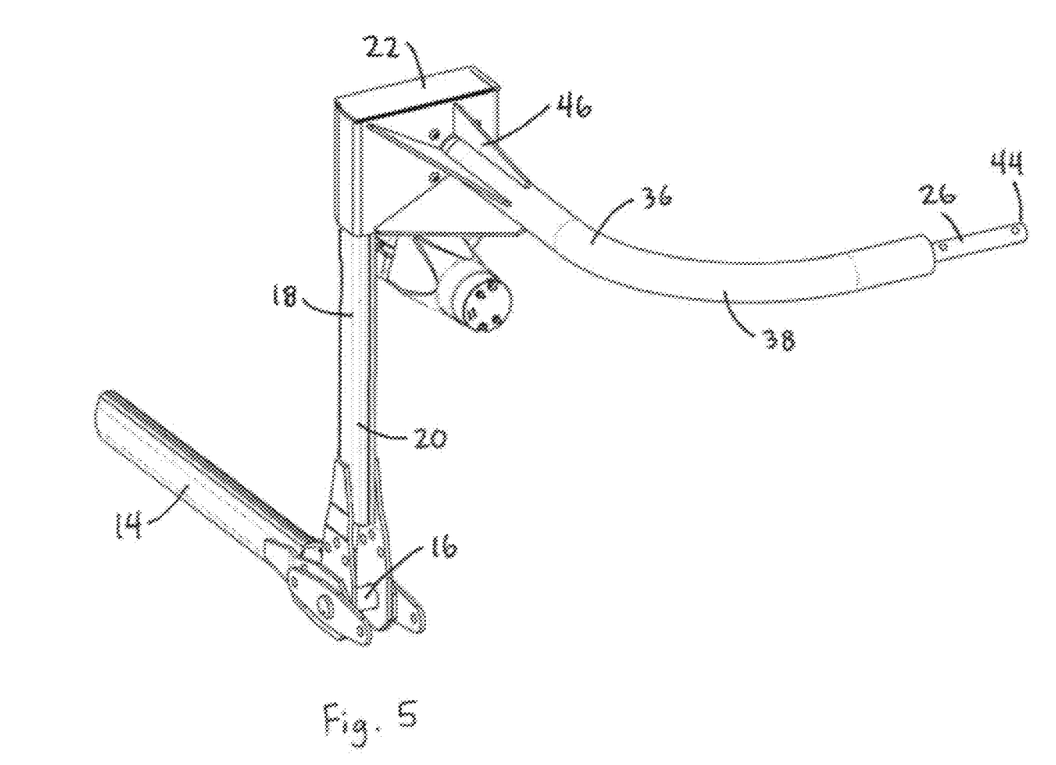
FIG. 5 shows a flexible torque shaft arm.

From the housing 22 to the axle shaft 28 for a tarp 30, the flexible torque shaft 26 or universal joint connector 27 may be enclosed in an enclosure 36 that is preferably substantially tube-like, rigid extrusion with a bend 38 having a radius to facilitate moving around a corner 40, such as top/front edge, of the container 22. FIG. 4 shows an embodiment of a flexible shaft and enclosure/extrusion assembly. In one embodiment, a flexible portion 42 may be encased within the enclosure 36 (as a rigid extrusion), such as primarily within the bend 38 for protection from wear and the elements. As such, the flexible portion 42 may be affixed to a rigid first end 32 that serves as a shaft to the motor 24. Similarly, the flexible portion 42 may be affixed to a rigid second end 44 that connects to the axle shaft 28 of the tarp 30.

To avoid interference of the upper arm assembly 18 with a corner 40 of the container 12, a resilient means 50 such as the springs in the pivot 16, such as a knuckle, of the arms 14 and 20 can hold the radius of the enclosure 36 (as a rigid extrusion) extending from upper arm 20 far enough above the corner 40 that the upper arm assembly 18 with the enclosure 36 and the corner 40 do not interfere with each other.

The arm 14 may be pivotably mounted on a base plate 48 that holds the arm 14 away from the container 12. The rigid aspect of the enclosure 34 can also keep the housing 22 away from the container 12. Thus, both arms 14 and 20 and the pivot 16 can operate without contacting the container 12.

The housing 22 and enclosure 36 (as a rigid extrusion) for the flexible torque shaft 26 or universal joint connector 27 can ideally be a one-piece enclosure. One option is to use a thick-walled extruded aluminum tube, machine out the ends for bearing pockets for a set of bearings 34, insert the flexible torque shaft 26 or universal joint connector 27, and bend the tube to the desired radius to form bend 38. The set of bearings 34 can be housed in the example rigid extrusion enclosure 36. Fins 46 can also be used to rigidly connect the enclosure 36 to the housing 22.

Figure 6:
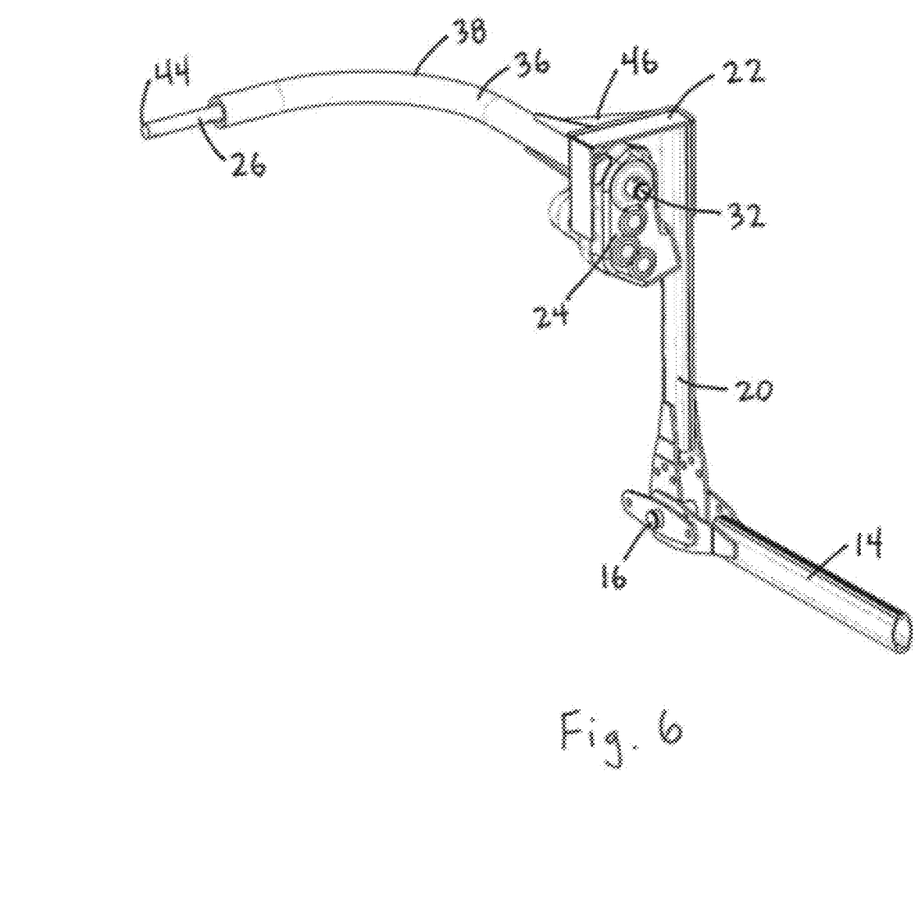
FIG. 6 shows a motor orientation for the flexible torque shaft arm.
Figure 7:
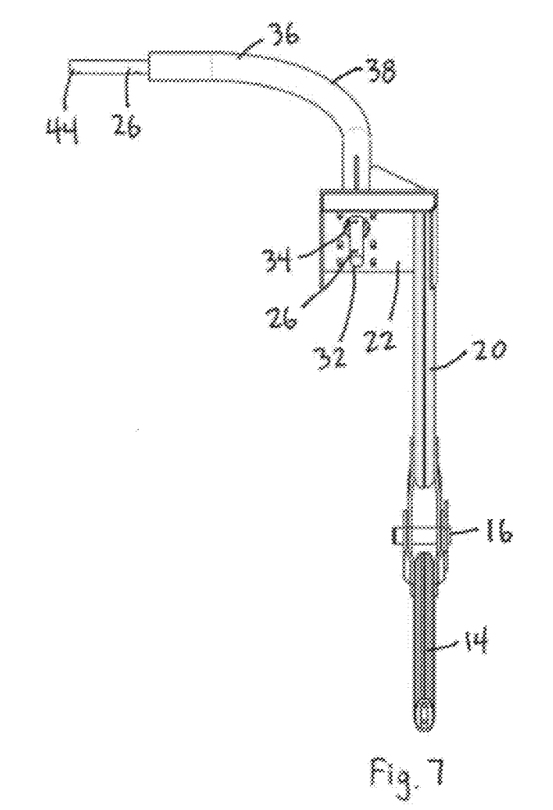
FIG. 7 shows a shaft end connected to the housing on the arm without a motor mounted.

FIG. 6 shows a view of a motor 24 affixed in association with the housing 22 functionally connected to the first end 32 of the flexible torque shaft 26 or universal joint connector 27. The motor 24 is a distance from the bend 38 in the enclosure 36 so the motor 24 remains clear of any corner 40 of the container 12.

Figure 8:
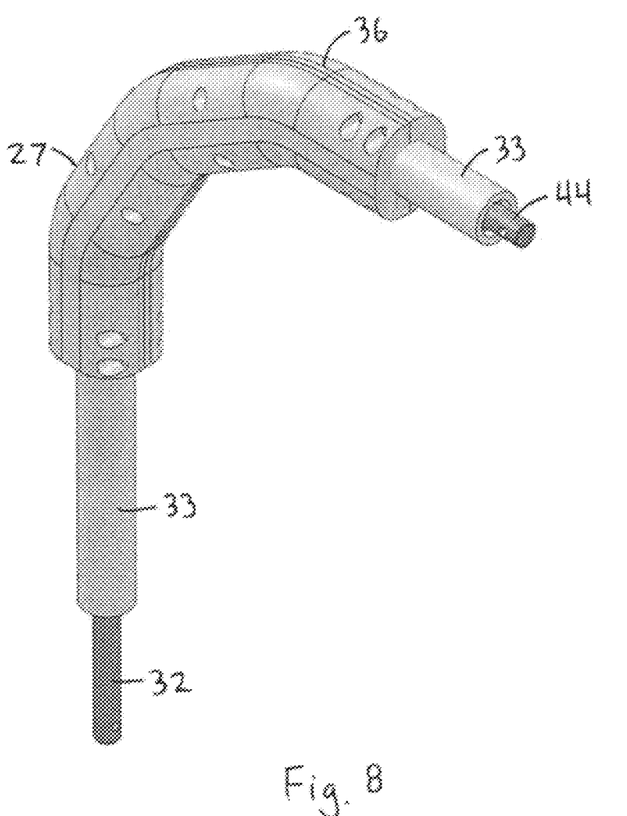
FIG. 8 shows a perspective view of a 90 degree universal joint assembly.

FIG. 8 shows a perspective view of a 90 degree universal joint assembly with an enclosure 36 having a substantially internal universal joint connector 27.

Figure 9:
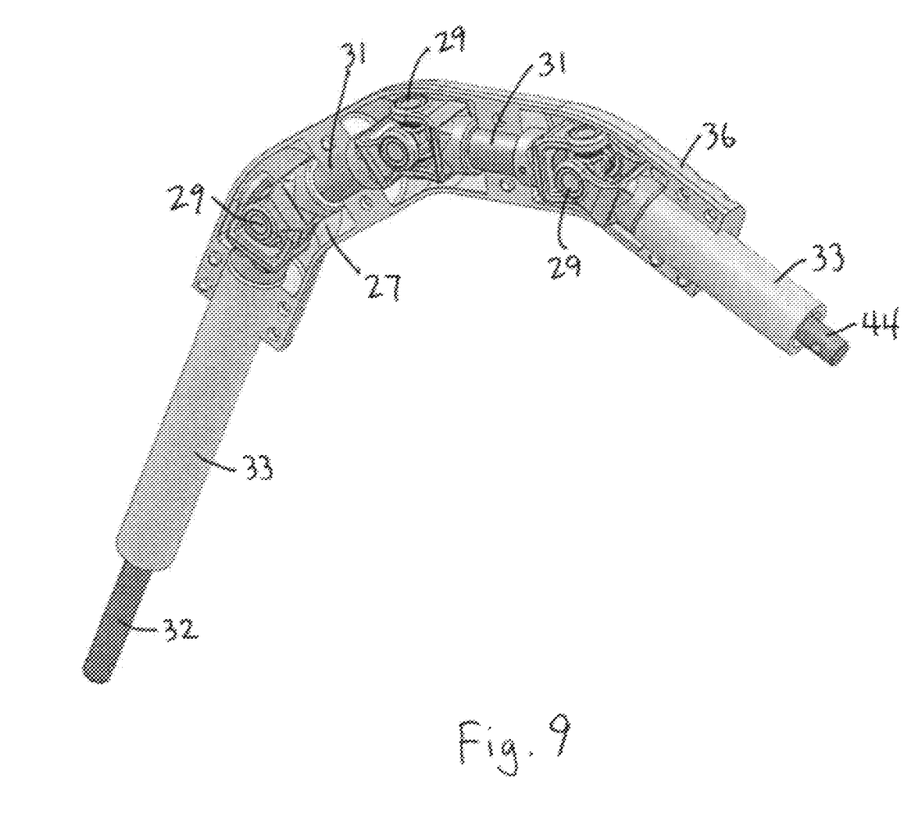
FIG. 9 shows a partial cut-away view of the 90 degree universal joint assembly.
Figure 10:
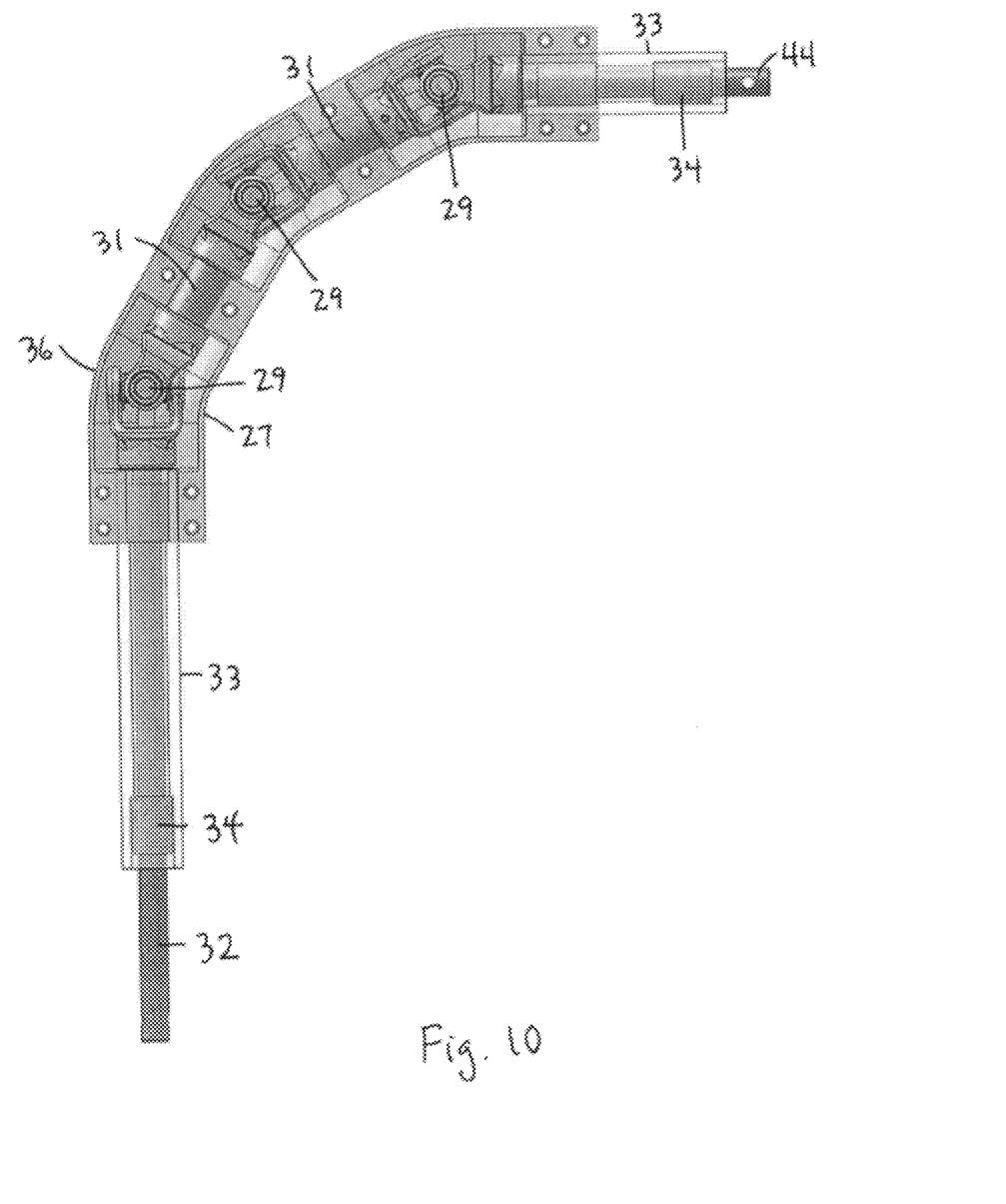
FIG. 10 shows a partial cut-away view of a side view of a 90 degree universal joint assembly with outer bearings.

As shown in FIGS. 9 and 10, the universal joint connector 27 preferably includes a series of universal joints 29 with internal shafts 31. The universal joint connector 27 may include ends 32 and 44. The universal joint connector 27 is a flexible drive shaft that transmits rotation between smaller shafts 31 whose axes are substantially coplanar but not necessarily coinciding. As such, the universal joint connector 27 can be contained inside an enclosure 36 with ends 32 and 44 extending from the enclosure 36. The internal shafts 31 have limited freedom of movement within the enclosure 36 that may be bent while transmitting rotary motion between the shafts. As prudent, the enclosure 36 may have cylinders 33 to encase the end shafts adjacent to ends 32 and 44. The series of universal joints 29 can provide motion where higher torque may be needed.

A side-to-side knuckle arm assembly can be used on a front side of the axle shaft 28 as such as with a roller or reel as a means to actuate a tarp 30, such as a roll tarp. The assembly can allow the tarp 30 to be wound upon a roller that moves in an opening direction or in reverse to unwind to close the tarp 30. The axle shaft 28 would be on one side of the container 12 with the tarp 30 in a closed position and on the opposite side of the container 12 in the open position.

The present disclosure eliminates or relocates components that might exceed the envelope or otherwise extend far from an open top container of a trailer or railcar.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. Intended for use with an open top container of a trailer or rail car, a tarp system comprising:
   a movable tarp on an axle adapted to cover contents of the container,
   a pivoting arm pivotable relative to the container;
   an upper arm;
   a pivot between the upper arm and the pivoting arm; wherein the upper arm extends from the pivot and pivots relative to the pivoting arm;
   a housing mounted on the upper arm;
   a motor associated with the housing;
   a bent enclosure extending from the housing, and
   a universal joint connector substantially inside the bent enclosure, a first end of the universal joint connector functionally connected with the motor and a second end of the universal joint connector attached to the axle that is used in conjunction with the tarp.

2. The tarp system of claim 1 wherein the motor is mounted on the housing to minimize an envelope of the tarp system around the container.

3. The tarp system of claim 1 wherein the universal joint connector includes a series of universal joints having internal shafts within the bent enclosure between the first end and the second end.

4. The tarp system of claim 1 wherein the first end of the universal joint connector passes through the housing and is rotatable relative to the housing and further comprising bearings in the enclosure surrounding the first end and the second end.

5. A tarp system attached to a container comprising:
   a roll tarp on an axle,
   a pivoting arm assembly attached to the container; the pivoting arm assembly including a housing with a motor;
   a rigid enclosure having a bend extending from the pivoting arm assembly; and
   a universal joint connector substantially inside the rigid enclosure; the universal joint connector with a first end connected to the motor and a second end attached to the axle.

6. The tarp system of claim 5 wherein the universal joint connector includes a series of universal joints having internal shafts within the bend.

7. The tarp system of claim 5 wherein the motor is mounted on the housing to minimize an envelope of the tarp system around the container.

8. The tarp system of claim 5 wherein the first end of the universal joint connector passes through the housing and is rotatable relative to the housing and further comprising bearings surrounding the first end and second end in the enclosure.

9. The tarp system of claim 5 wherein the rigid enclosure is an extruded tube.

\* \* \* \* \*